Patented Nov. 11, 1947

2,430,596

UNITED STATES PATENT OFFICE 2,430,596

SHORTENING HAVING AN EXTENDED PLASTIC RANGE

Norbert W. Ziels, Leonia, and Werner H. Schmidt, Grantwood, N. J., assignors to Lever Brothers Company, Cambridge, Mass., a corporation of Maine No Drawing. Application June 9, 1944,
Serial No. 539,604

2 Claims. (Cl. 99—122)

This invention relates to a plastic edible shortening and method of manufacturing the same.

More particularly the invention relates to a plastic shortening of the so-called "compound" type which possesses desirable consistency and hardness properties over an extremely wide range of temperatures.

Two types of shortenings are conventionally manufactured. One type is the so-called "all-hydrogenated" type, which is made by refining oils and hydrogenating to increase their consistency. During the manufacture of this type of shortening the oils or fats are maintained in a liquid state and at a suitable point in the process, oils and fats having different characteristics are mixed and blended.

It has been proposed heretofore to include a small portion of a hard fat in order to increase the plastic range of this so-called "all-hydrogenated" shortening. But since our invention does not relate to this type of shortening, further discussion of the prior art of this nature is not necessary to an understanding of the improvement which constitutes the present invention.

The other type of shortening is the so-called "compound" type, in the manufacture of which it is customary to refine edible oils, such as naturally-occurring vegetable oils, and without hydrogenating or hardening the same, to mix or blend these oils in their liquid state with a melted normally solid fat to yield a final semi-solid product having the desirable characteristics. The normally solid fat used in blending with the oil is usually obtained by hydrogenating a vegetable oil until it is solid at normal temperature. The amount used is sufficient to give the final product a semi-solid consistency at the desired temperatures. This blending operation is carried out at an elevated temperature at which the normally solid fat melts and is liquid, following which the mixture is chilled to a semi-solid plastic state, and air or an inert gas may be incorporated in a fine state of sub-division in order to give the shortening a white appearance and a creamy smooth texture.

A typical example of such a shortening, in accordance with the long-established prior art, is made by mixing 85% of unhydrogenated cottonseed oil with 15% of cottonseed oil which had been hydrogenated to an iodine value of about 20 and a titer of about 55° C. The blend is then processed in the usual manner to form a semi-solid product.

Patent No. 2,304,452 describes an improvement on this prior art, in which a "compound" shortening is made by using a smaller amount of a very hard fat having a titer of 65° C. or above, such as may be made, for example, by hydrogenating sesame oil to an iodine value of about 1 or 2. In accordance with this patent, an increased plastic range is obtained in the final product, that is, the shortening will retain its plastic characteristics over a wider temperature range. In other words, the shortening does not become too hard or solid to be workable at low temperatures, and does not melt or become too soft at high temperatures. This patent contains an extended discussion of the action of shortening in baked products, the "shortening power" of the shortening, as well as a discussion of the desirability of a shortening having a wide plastic range. Reference may be had thereto for a consideration of these factors.

This plasticity characteristic in a "compound" type shortening was obtained in accordance with Patent No. 2,304,452 over the range of temperatures normally encountered in the household, namely, a temperature range of about 50 to 83° F. Temperatures below and above this range are not ordinarily encountered in the home where such products are to be used. Products having the desired plasticity over this limited temperature range were made, in accordance with the patent, by employing from 5 to 20%, preferably 9 to 15% of an unusually hard fat having a titer of 65° C. or above in admixture with an unhydrogenated oil to produce a shortening of the so-called "compound" type.

While the method of Patent No. 2,304,452 is admirable in the making of shortenings which have an enhanced plasticity range over a median temperature range, the method of the patent leaves something to be desired in the production of a shortening which will retain its plasticity over a much broader range; for example, temperatures as low as 35° F., which might be encountered in bakeries in very cold climates, such as Iceland, as well as temperatures as high as 120° F. which are encountered in bakeries in the tropics.

It is possible to prepare shortenings by prior art methods which are plastic at temperatures as high as 120° F., but such shortenings become so hard as to be unworkable at temperatures as low as 35° F. The production of a shortening which will retain a workable plasticity over a temperature range varying from 35 to 120° F. has not been produced nor proposed in accordance with the prior art.

As indicative of the results that may be obtained using a hard fat having a titer of 65° C. or above, in an amount of 20% (which is the upper limit of the range referred to in Patent No. 2,304,452), the data in the following table may be considered:

Table I

| Stock | | | | Penetration | | | |
|---|---|---|---|---|---|---|---|
| Liquid Oil and Amount | Solid Fat (Hydrogenated Oil) | | | 35° F. | 70° F. | 90° F. | 120° F. |
| | Oil | Amount | I. V. | Titer | | | |
| | | Per cent | | ° C. | | | |
| Soybean 80% | Sesame | 20 | 2.2 | 65.8 | 285 | 295 | 295 | Too Soft. |
| Do | Sunflower | 20 | 2.0 | 65.8 | 370 | 380 | 378 | Do. |
| Do | Soybean | 20 | 1.9 | 65.3 | 235 | 300 | Too Soft | Do. |
| Cottonseed 80% | ...do... | 20 | 1.9 | 65.3 | 150 | 215 | 249 | Do. |
| Peanut 80% | ...do... | 20 | 1.9 | 65.3 | 185 | 290 | 440 | Do. |

From the above table it will be seen that when using 20% of the solid fat having a titer of 65.0° C. or above in admixture with the liquid oil, the resulting product, while having desirable plasticity properties through the range of 50 to 85° F., is too soft at higher temperatures to function as a shortening.

In order that a fat may have a measurable penetration at a temperature of 120° F., it is necessary to use 25% or more of the hard fats having a titer of 65° C. or more of the type referred to in the table.

In all of the above instances the hard fat having a titer of 65° C. or above is formed by hydrogenating an oil which naturally contains a large amount of glycerides of $C_{18}$ fatty acids, e. g. stearic, oleic, linoleic, etc. When hydrogenated, the oleic and linoleic acids are converted into stearic acid so that substantially all of the hard fat is composed of stearin. Oils which contain a substantial proportion of fatty acids having less than 18 carbon atoms do not have a titer as high as 65° C. even when fully hydrogenated, as is pointed out in Patent No. 2,304,452.

In the above table the penetration is a measure of the plasticity, the lower figures indicating a harder consistency. In general, a penetration cannot be lower than 100, at the lowest temperature at which the shortening is to be used. The higher penetrations indicate a softer consistency and in general it is desirable that the shortening should have a penetration of not over 350 at the higher temperature. When the penetration exceeds 450, the mixture has become so "soupy" as to render it impossible to make the penetration measurement and these are indicated in the table as "too soft" to measure.

The plasticity of a shortening is a characteristic which permits it to be worked. If the shortening is too stiff or hard it is resistant to cutting, mixing, creaming and general handling in a culinary operation. On the other hand, if the shortening is too soft, it is also unsuitable for creaming and other culinary operations.

Although various methods have been proposed for measuring the plasticity or consistency of the shortening, the so-called penetration test is recognized in the art as a reasonably satisfactory test. This is analogous to the "Brinell" hardness test applied to metals. The test method in brief is to measure the penetration of a standard "needle" in a sample of shortening under uniform temperature and other conditions. The depth of the penetration of the needle into the shortening is usually expressed in arbitrary units. The farther the needle penetrates the shortening the higher is the penetration figure and the softer the shortening. Reference may be had to an article by A. D. Rich entitled "Methods employed in expressing the consistency of plasticized shortenings" appearing in "Oil & Soap," vol. XIX, No. 3, March, 1942, pp. 54–57, for more complete details as to this property of shortenings and its measurement, and the instrument used is as described in this article except that the conical shaped needle is made of aluminum and weighs 47 grams.

In making the penetration determination the shortening is kept at the indicated temperature ±1° F. for at least twenty-four hours before taking the reading. The surface of the shortening is scraped smooth and the tip of the penetrometer needle is lowered so that it just touches the smooth surface of the shortening. The penetrometer recording shaft is then lowered to contact the end of the needle spindle. The penetrometer dial is then turned to the zero position without disturbing the positions of the needle spindle or the recording shaft. The needle is then elevated equivalent to exactly 200 divisions on the indicator, and the needle is then released quickly by pressing the knob on the penetrometer for this purpose. The needle falls and sinks into the shortening a given distance depending upon the hardness or softness of the shortening at the temperature at which it is tested. The recording shaft is then lowered until it just touches the end of the needle spindle. The reading on the indicator dial is known as the penetration.

We have discovered, in accordance with our invention, that it is possible to produce a shortening having a desirable plasticity which is retained over the wide temperature range of 35° F. to 120° F. This is accomplished by employing a hard fat having a titer of less than 65° F., such as may be obtained, for example, by fully hydrogenating cottonseed oil and oils having similar characteristics. As indicative of the results that may be obtained in accordance with our invention, the following data is set forth:

Table II

| Stock | | | | Penetration | | | |
|---|---|---|---|---|---|---|---|
| Liquid Oil and Amount | Solid Fat (Hydrogenated Oil) | | | 35° F. | 70° F. | 90° F. | 120° F. |
| | Oil | Amount | I. V. | Titer | | | |
| | | Per cent | | ° C. | | | |
| Soybean 80% | Cottonseed | 20 | 1.8 | 62 | 132 | 150 | 188 | 280 |
| Cottonseed 80% | ...do... | 20 | 1.8 | 62 | 115 | 139 | 187 | 212 |
| Peanut 80% | ...do... | 20 | 1.8 | 62 | 100 | 130 | 194 | 300 |

From the above data it will be seen that when employing 20% cotton seed oil hydrogenated to an I. V. of 1.8, having a titer of 62° C., a shortening is obtained which has desirable plastic properties over the wide temperature range of 35° to 120° F.

As will be seen, the penetrations vary slightly with the liquid oil component of the stock, but in all instances the penetrations fall within a desirable range at all of the temperatures. Thus the invention is relatively independent of the oil used as the base stock. The variations may be readily explained because of the different constituents in the liquid oil itself.

The amount of the hard fat to be used in accordance with the invention may vary somewhat. In general, the amount should not be less than will give a product having a measurable penetration at 120° F. and preferably one having a penetration of not over 350 at this temperature. In general, the amount should be not more than will yield a penetration of less than 100 at the lowest temperature at which the shortening is to be used, i. e., 35° F. In general, the amount of the hard fat will be from about 17 to 23%. The extent to which the cotton seed oil is hydrogenated is important and the I. V. should be brought down to a point where the titer will be above 60° C.

In considering our invention and the results obtained, we have concluded that our novel shortening can be obtained using fully hydrogenated cottonseed oil, but cannot be obtained using fully hydrogenated sesame or soybean oil. This can be attributed to the fact that cottonseed oil contains a substantial proportion of glycerides of palmitic acid. The fatty acids in cottonseed oil vary as follows:

| Myristic | Palmitic | Stearic | Arachidic | Oleic | Linoleic |
| --- | --- | --- | --- | --- | --- |
| Per cent | Per cent | Per cent | Per cent | Per cent | Per cent |
| 3.3 | 19.9 | 1.3 | 0.6 | 29.6 | 45.3 |
| 2.0 | 19.6 | 2.7 | 0.7 | 24.6 | 50.4 |
| 0.3 | 20.2 | 2.0 | 0.6 | 35.2 | 41.7 |
| 0.5 | 21.9 | 1.9 | 0.1 | 30.7 | 44.9 |
| -------- | 23.4 | ------ | -------- | 23.0 | 53.6 |

When the cottonseed oil is hydrogenated so that substantially all of the oleic and linoleic acids are converted into stearic acid, the hydrogenated cottonseed oil would have substantially the following composition:

| Myristic | Palmitic | Stearic | Arachidic | Oleic | Linoleic |
| --- | --- | --- | --- | --- | --- |
| Per cent | Per cent | Per cent | Per cent | | |
| 3.3 | 19.9 | 76.2 | 0.6 | ------ | ------ |
| 2.0 | 19.6 | 77.7 | 0.7 | ------ | ------ |
| 0.3 | 20.2 | 78.9 | 0.6 | ------ | ------ |
| 0.5 | 21.9 | 77.5 | 0.1 | ------ | ------ |
| -------- | 23.4 | 76.6 | -------- | ------ | ------ |

Thus it will be seen that fully hydrogenated cottonseed oils contain roughly about 20% palmitic acid and the balance, primarily stearic acid. This mixture is thought to have properties in the nature of a eutectic which upon hardening in the shortening forms a crystalline structure which is retained to a maximum extent over a wide temperature range.

In order to confirm this, a shortening was prepared in which the hard fat, instead of being fully hydrogenated cottonseed oil, was prepared synthetically from a mixture of pure tristearin and pure tripalmitin. The results are:

Table III

| Stock | | | | | Penetration | | | |
| --- | --- | --- | --- | --- | --- | --- | --- | --- |
| Liquid Oil and amount | Solid Fat | | | | 35° F. | 70° F. | 90° F. | 120° F. |
| | Fat | Amount | I. V. | Titer | | | | |
| | | Per cent | | ° C. | | | | |
| Soybean 80% | Tristearin | 20 | 0.7 | 66.3 | 200 | 232 | 260 | Too soft. |
| Do | Tripalmitin | 20 | 0.9 | 61.2 | 290 | 295 | 340 | Do. |
| Do | {Tristearin / Tripalmitin} | {15 / 5} | 0.75 | 61.0 | 185 | 195 | 204 | 380. |

From the above table it will be seen that the use of a mixture of tripalmitin and tristearin in roughly the same proportions as occur in fully hydrogenated cottonseed oil produces a shortening which retains its plasticity at 120° F. In contrast to this, the use of 20% tristearin, although this is a harder fat than the mixture of tristearin and tripalmitin, produces a shortening which is too soft at 120° F. The result cannot be attributed solely to the presence of the tripalmitin since the use of 20% of this fat also gives a product that is too soft at 120° F. The new result is indeed surprising, since it has been the view of the prior art that the use of a harder fat in compounding the shortening would produce a shortening which would retain its plasticity at a higher temperature.

Our new shortening not only has desirable properties as to plasticity, but since it achieves this by using a lesser amount of the hard fat as well as a hard fat having a lower titer, the new shortening should have superior properties with reference to digestibility. Our new shortening also has a lower melting point than shortenings having the same plasticity and made with greater percentages of stearines having a higher titer.

The invention is not limited to the use of hydrogenated cotton seed oil but can be used with either natural or artificially prepared hard fats which contain palmitic acid and stearic acid within the desired ranges. For example, beef fat contains from 18 to 32% palmitic acid, 2 to 7% myristic acid and the balance are $C_{18}$ fatty acids, stearic, oleic and linoleic. When this material is hydrogenated, it would give a product comprising primarily glycerides of palmitic and stearic acids within the necessary proportions. In general, the hard fat that is used in accordance with the invention should contain glycerides of fatty acids. The fatty acids should comprise 15 to 30% palmitic acid; not more than 8% fatty acids other than palmitic or stearic acids, such as myristic, oleic or linoleic acids, etc.; and the balance stearic acid.

It will be obvious, in accordance with our invention, that the hard fat can be prepared synthetically, or by hydrogenating naturally-occurring oils, if they produce a hard fat having the required composition. It will also be obvious that the invention can be used employing many liquid oils for compounding shortening and that the proportions may vary within the ranges expressed herein. The manner of preparing the materials, blending, chilling, texturizing and packaging the shortening may be in accordance with any method known heretofore in the art and we do not intend our invention to be limited except by the scope of the following claims.

We claim:

1. An all-climate plastic shortening having desirable plasticity characteristics over an extremely wide temperature range, in which the shortening ingredients consist of an edible liquid glyceride oil blended with from about 17 to about 23% of a hard glyceride fat formed of glycerides of fatty acids, the fatty acid constituents of which comprise at least 92% of palmitic and stearic acids of which the palmitic acid comprises 15 to 30%, said shortening having a penetration within the range of 100 to 400 over a temperature range of 35 to 120° F.

2. An all-climate plastic shortening having desirable plasticity characteristics over an extremely wide temperature range, in which the shortening ingredients consist of an edible liquid glyceride oil blended with from about 17 to about 23% of cottonseed oil hydrogenated to a titer of over 60° C. and less than 65° C., to impart to the shortening a penetration within the range of 100 to 400 over a temperature range of 35 to 120° F.

NORBERT W. ZIELS.
WERNER H. SCHMIDT.

REFERENCES CITED

The following references are of record in the file of this patent:

UNITED STATES PATENTS

| Number | Name | Date |
|---|---|---|
| 2,304,452 | Gudheim | Dec. 8, 1942 |
| 2,174,365 | Gudheim | Sept. 26, 1939 |